(12) United States Patent
Yadgar

(10) Patent No.: US 10,193,201 B2
(45) Date of Patent: Jan. 29, 2019

(54) SYSTEM AND METHOD FOR CONTROLLING OPERATION OF A METAL-AIR BATTERY

(71) Applicant: PHINERGY LTD., Lod (IL)

(72) Inventor: Avraham Yadgar, Kiryat Ono (IL)

(73) Assignee: PHINERGY LTD., Lod (IL)

( * ) Notice: Subject to any disclaimer, the term of this patent is extended or adjusted under 35 U.S.C. 154(b) by 0 days.

(21) Appl. No.: 14/413,430

(22) PCT Filed: Jul. 9, 2013

(86) PCT No.: PCT/IL2013/050583
§ 371 (c)(1),
(2) Date: Jan. 8, 2015

(87) PCT Pub. No.: WO2014/009951
PCT Pub. Date: Jan. 16, 2014

(65) Prior Publication Data
US 2015/0171495 A1    Jun. 18, 2015

Related U.S. Application Data

(60) Provisional application No. 61/669,160, filed on Jul. 9, 2012.

(51) Int. Cl.
*G01N 27/416* (2006.01)
*H01M 12/08* (2006.01)
(Continued)

(52) U.S. Cl.
CPC ......... *H01M 12/08* (2013.01); *H01M 10/443* (2013.01); *H01M 10/48* (2013.01);
(Continued)

(58) Field of Classification Search
CPC .................................................. H01M 12/08
(Continued)

(56) References Cited

U.S. PATENT DOCUMENTS

| 5,151,865 A | 9/1992 | Blessing |
| 5,543,243 A | 8/1996 | Brecht |

(Continued)

FOREIGN PATENT DOCUMENTS

| JP | 1976-015126 | 2/1976 |
| JP | 1977-048028 | 4/1977 |

(Continued)

OTHER PUBLICATIONS

International Search Report of PCT Application No. PCT/IL2013/050583 dated Nov. 27, 2013.
(Continued)

*Primary Examiner* — Yalkew Fantu
(74) *Attorney, Agent, or Firm* — Pearl Cohen Zedek Latzer Baratz LLP

(57) ABSTRACT

A system and method for controlling operation a metal-air battery are provided. A system and method for controlling operation a metal-air battery may include controlling a current drawn from the battery; and controlling a temperature of the battery. A system and method may draw a preconfigured amount of power from a metal-air battery, and draw power from a rechargeable device when power required is greater than the preconfigured power.

17 Claims, 6 Drawing Sheets

(51) Int. Cl.
  *H01M 10/44* (2006.01)
  *H01M 10/48* (2006.01)
  *H01M 12/06* (2006.01)
  *H01M 10/615* (2014.01)
  *H01M 10/6567* (2014.01)
  *H01M 10/613* (2014.01)
  *H01M 4/38* (2006.01)
  *H01M 10/625* (2014.01)
  *H01M 10/635* (2014.01)

(52) U.S. Cl.
  CPC ....... *H01M 10/484* (2013.01); *H01M 10/486* (2013.01); *H01M 10/613* (2015.04); *H01M 10/615* (2015.04); *H01M 10/6567* (2015.04); *H01M 12/06* (2013.01); *H01M 4/38* (2013.01); *H01M 10/625* (2015.04); *H01M 10/635* (2015.04); *H01M 2220/20* (2013.01)

(58) Field of Classification Search
  USPC ......................................................... 324/426
  See application file for complete search history.

(56) References Cited

U.S. PATENT DOCUMENTS

| | | | |
|---|---|---|---|
| 5,898,282 A * | 4/1999 | Drozdz | B60L 11/123 |
| | | | 180/65.235 |
| 6,287,715 B1 * | 9/2001 | Faris | H01M 6/5011 |
| | | | 429/127 |
| 6,372,371 B1 | 4/2002 | Larochenko et al. | |
| 6,991,876 B2 * | 1/2006 | Narang | H01M 4/364 |
| | | | 429/213 |
| 7,940,028 B1 | 5/2011 | Hermann | |
| 2003/0143446 A1 | 7/2003 | Faris et al. | |
| 2003/0162095 A1 | 8/2003 | Huang et al. | |
| 2010/0330437 A1 | 12/2010 | Burchardt et al. | |
| 2011/0195321 A1 | 8/2011 | Takahashi et al. | |
| 2012/0021303 A1 | 1/2012 | Amendola et al. | |
| 2012/0038314 A1 * | 2/2012 | Stewart | H01M 16/006 |
| | | | 320/103 |
| 2012/0041625 A1 | 2/2012 | Kelty et al. | |
| 2012/0041627 A1 | 2/2012 | Kelly et al. | |
| 2012/0041628 A1 * | 2/2012 | Hermann | H01M 8/04089 |
| | | | 701/22 |

FOREIGN PATENT DOCUMENTS

| | | |
|---|---|---|
| JP | 3670978 | 7/2005 |
| JP | 2010-004638 | 1/2010 |
| KR | 1020010030958 | 4/2001 |
| TW | 503598 | 9/2002 |
| TW | I231064 | 4/2005 |
| WO | WO 2011/077532 | 6/2011 |

OTHER PUBLICATIONS

Supplementary European Search Report of EP Application No. EP 13 81 6400 dated May 20, 2016.

Office Action of Taiwanese Application No. 102124647 dated Dec. 5, 2016.

Office Action of Japanese Application No. 2015-521144 dated Jan. 10, 2017.

Office Action of Korean Application No. 10-2015-7003016 dated Jul. 6, 2017.

Office Action of Japanese Application No. 2015-521144 dated Jan. 12, 2018.

Notice of Allowance of of Korean Application 10-2015-7003016 dated Mar. 7, 2018.

\* cited by examiner

SYSTEM AND METHOD FOR CONTROLLING OPERATION OF A METAL-AIR BATTERY

CROSS-REFERENCE TO RELATED APPLICATIONS

This application is a National Phase Application of PCT International Application No. PCT/IL2013/050583, filed Jul. 9, 2013, entitled "System and Method for Controlling Operation of a Metal-Air Battery" published on Jan. 16, 2014 as International Publication No. WO 2014/009951, claiming priority of U.S. Provisional Patent Application No. 61/669,160 filed Jul. 9, 2012, all of which are incorporated herein by reference in their entirety.

FIELD OF THE INVENTION

The present invention pertains to batteries. In particular, the present invention pertains to controlling an operation of a metal-air battery.

BACKGROUND OF THE INVENTION

As known in the art, a battery is a component that stores chemical energy and makes the energy available in an electrical form. Metal-air batteries use oxidation of metal with oxygen from air to produce electricity. Electric energy produced by batteries is used by various systems and components, e.g., consumer products, industrial systems ant the like. However, known systems and methods draw energy from a battery as, and when needed. Accordingly, utilization of energy stored in a battery may not be optimal.

SUMMARY OF THE INVENTION

A method may include controlling a current drawn from a metal-air battery; and controlling a temperature of the battery. A method may include causing the battery to operate according to a profile, the profile defining at least one of: an energetic utilization ratio, power, an electrolyte utilization value and a corrosion rate. In an embodiment, the profile is automatically selected by a controller.

A method may include repeatedly setting the current drawn from a battery and setting the temperature of the battery until a desired energetic utilization ratio is achieved. A method may include determining an age of an electrolyte included in the battery and controlling, based on the age of the electrolyte, at least one of: an electric current provided by the battery, a temperature of the battery, a temperature of the electrolyte and voltage provided by the battery. A method may include controlling at least one of: an electric current provided by the battery, a temperature of the battery, a temperature of the electrolyte and a voltage provided by the battery, such that a predefined ratio between an amount of metal consumed in an electrochemical reaction and a total amount of metal in the battery is maintained.

A method may include controlling at least one of: an electric current provided by the battery, a temperature of the battery, a temperature of the electrolyte and a voltage provided by the battery such that a predefined corrosion rate of metal included in the battery is maintained. A method may include controlling at least one of: an electric current provided by the battery, a temperature of the battery, a temperature of the electrolyte and a voltage provided by the battery to maximize an amount of energy drawn from the battery per volume unit of electrolyte included in the battery.

A method may include controlling at least one of: an electric current provided by the battery, a temperature of the battery, a temperature of the electrolyte and a voltage provided by the battery to minimize a rate by which metal is dissolved in electrolyte included in the battery.

A method may include controlling a temperature of the battery by controlling a temperature and circulation of electrolyte included in the battery. A method may include, prior to activating a battery, determining an age of an electrolyte included in the battery; and setting the temperature of the electrolyte according to a profile.

A system may comprise a metal-air battery; and a controller, the controller configured to: control a current drawn from the battery, and control a temperature of the battery. A system may comprise a rechargeable device and the system may be configured to: draw a predefined power from the metal-air battery, the predefined power defined according to an average power requirement; and draw power from the rechargeable device when power required by the electric car is greater than the predefined power.

A controller included in a system may be configured to cause a battery to operate according to a profile, the profile defining at least one of: an energetic utilization ratio, power, an electrolyte utilization value and a corrosion rate. A controller included in a system may be configured to automatically select a profile and cause a battery to operate according to a selected profile. A controller included in a system may be configured to repeatedly set the current drawn from the battery and the temperature of the battery until a desired energetic utilization ratio for the battery is achieved.

A controller included in a system may be configured to determine an age of an electrolyte included in the battery and to control, based on the age of the electrolyte, at least one of: an electric current provided by the battery, a temperature of the battery, a temperature of the electrolyte and voltage provided by the battery. A controller included in a system may be configured to control at least one of: an electric current provided by the battery, a temperature of the battery, a temperature of the electrolyte and a voltage provided by the battery such that a predefined ratio between an amount of metal consumed in an electrochemical reaction and a total amount of metal in the battery is maintained. A controller included in a system may be configured to control at least one of: an electric current provided by the battery, a temperature of the battery, a temperature of the electrolyte and a voltage provided by the battery such that a predefined corrosion rate of metal included in the battery is maintained.

A controller included in a system may be configured to control at least one of: an electric current provided by the battery, a temperature of the battery, a temperature of the electrolyte and a voltage provided by the battery to maximize an amount of energy drawn from the battery per volume unit of electrolyte included in the battery. A controller included in a system may be configured to control at least one of: an electric current provided by the battery, a temperature of the battery, a temperature of the electrolyte and a voltage provided by the battery to minimize a rate by which metal is dissolved in electrolyte included in the battery. A system may include a battery that comprises metal anodes made of one of: Aluminum, Zinc and Iron.

A system may control a temperature of a battery by controlling a temperature and circulation of electrolyte included in the battery. A controller included in a system may be configured to, prior to activating the battery, determining an age of an electrolyte included in the battery; and setting the temperature of the electrolyte according to a profile. A an electric vehicle according to an embodiment may comprise a metal-air battery; rechargeable device; and a controller, the controller configured to set the power supplied to the electric vehicle according to a profile, the profile defining at least one of: an energetic utilization ratio, a power rate, an electrolyte utilization value, and a corrosion rate.

An electric vehicle according to an embodiment may be configured to consume a preconfigured power from the metal-air battery; and consume power from the rechargeable device when power required by the electric vehicle is greater than the preconfigured power. According to an embodiment, when power required by the electric vehicle is less than a preconfigured power, the electric vehicle may be configured to use power provided by a metal-air battery to charge a rechargeable device. According to an embodiment, a capacity of the rechargeable device may be designed to supply an average daily energy consumption of an electric vehicle and a metal-air battery may be designed to supply energy in excess of the average daily energy.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

Figure 1:
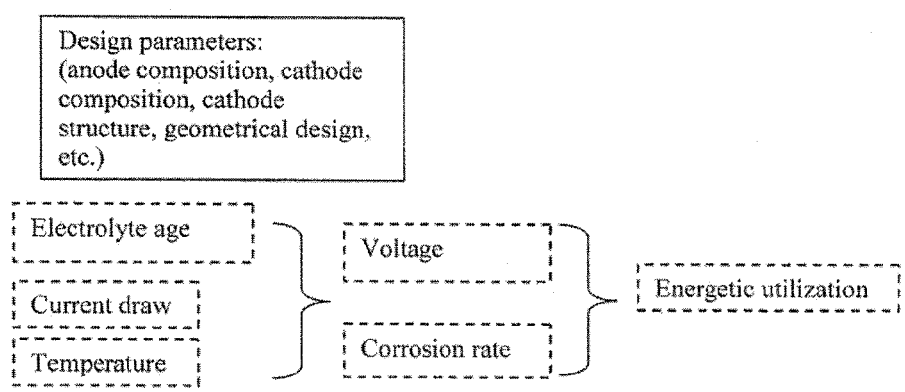
FIG. 1 shows parameters that effect operation of a metal-air cell.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However, it will be understood by those having ordinary skill in the art that the invention may be practiced without these specific details. In other instances, well-known methods, procedures, components, modules, units and/or circuits have not been described in detail so as not to obscure the invention.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like.

Unless explicitly stated, the method embodiments described herein are not constrained to a particular order or sequence. Additionally, some of the described method embodiments or elements thereof can occur or be performed at the same point in time or overlapping points in time. As known in the art, an execution of an executable code segment such as a function, task, sub-task or program may be referred to as execution of the function, program or other component.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Embodiments of the invention may enable controlling operation of a metal-air cell or battery (e.g., an aluminum-air battery) in order to improve its utilization. Although for the sake of simplicity, aluminum-air cell or battery is mainly referred to herein, it will be understood that other metal-air cells or batteries may be applicable. For example, systems and methods according to embodiments of the invention may use Zinc-air or any other suitable metal-air batteries or cells.

An aluminum-air battery consumes aluminum in order to generate electric energy. The electrochemical reaction that takes place in an aluminum-air cell is as shown by equation (1) below:

$$4Al + 6H_2O + 3O_2 \rightarrow 4Al(OH)_3 + 2.71v \qquad (1)$$

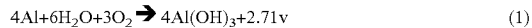

In practice, an aluminum-air cell may operate at a voltage lower than 2.7 v as shown by equation (1), typically 0.7 to 1.5 volts. The rest of the energy is released as heat. In addition to this reaction, which results in electric energy, the a corrosion reaction may take place as shown by equation (2) below:

$$2Al + 6H_2O \rightarrow 2Al(OH)_3 + 3H_2 \qquad (2)$$

The reaction shown by equation (2) consumes aluminum but does not release electrical energy. Therefore, it is considered an unwanted or parasitic reaction. An additional side effect of the reaction shown by equation (2) is the release of Hydrogen.

As referred to herein, the term "columbic efficiency" of a metal-air cell or metal-air battery is the ratio between the amount of metal that is consumed in the electrochemical reaction (1) and the total amount of metal that is consumed, that is, the amount of metal that is consumed according to both equation (1) and (2).

The specific energy of aluminum is known in the art to be 8.1 kWh/kg. As referred to herein, the term "energetic utilization" of aluminum is the ratio between the amount of electric energy that is extracted from one ("1") kilogram (Kg) of aluminum, and the total energy included in one ("1") Kg of aluminum.

Generally, as referred to herein, the term "energetic utilization" of metal is determined by two factors:

1. The corrosion rate—which determines, or effects, columbic efficiency. That is, how much metal is lost without producing electric energy, and 2. Actual cell voltage—which is related to the part or portion of the electric energy that is exploited (e.g., not released as heat).

As referred to herein and known in the art, an electrolyte (or electrolyte solution) may be any liquid that contains ions and can be decomposed by electrolysis. An electrolyte may include any matter, substance or compound that ionizes when dissolved in suitable ionizing liquid or solvent, e.g., water. In an aluminum-air cell or battery, where alkaline electrolyte such as KOH or NaOH is used, an additional reaction takes place as shown by equation (3):

$$Al(OH)_3 + KOH \rightarrow KAl(OH)_4 \tag{3}$$

The product of the reaction shown by equation (3) is dissolved in the electrolyte throughout the operation of the battery, and typically causes the voltage of the cells to gradually decrease, down to some low voltage threshold (typically 0.7-0.9 volt).

As referred to herein, the term "electrolyte utilization" is the amount of energy that can be drawn from a metal-air cell before it reaches the low voltage threshold (e.g., the range of 0.7-0.9 volt).

Electrolyte utilization may be affected by the corrosion rate and by cells voltage. The term "corrosion rate" as referred to herein is the rate or measure by which metal is dissolved in the electrolyte without contributing electric energy. The term "cell voltage" as referred to herein generally relates to the electrical potential difference between anode and cathode of cell in a battery. Therefore, cell voltage may be indicative of the amount of energy that can be extracted from the useful metal in a metal-air cell.

As referred to herein, the specific energy of a metal-air battery is the amount of energy that can be extracted from the battery, divided by the battery's total weight. As described herein, an embodiment may improve or raise the specific energy of a metal-air battery by improving the utilization of the metal fuel and/or by improving the utilization of the electrolyte. It will be noted that an improvement of the utilization of an electrolyte in a battery is enabled by embodiments of the invention even though the electrolyte itself does not release energy but rather, enables the metal (e.g., aluminum) in a metal-air battery to release energy as described.

An embodiment of the invention increases the energetic efficiency of a metal-air battery by controlling operational parameters of the cells in the battery, such as discharge current and battery temperature. An embodiment of the invention increases the energetic efficiency of a metal-air battery by controlling a rate at which electrolyte is circulated through the battery. For example and as described, a pump controlled by a controller may circulate an electrolyte through chambers or cells in a battery at a controlled rate or according to controlled intervals. A controller may control a pump and valves such that electrolyte flows through specific spaces or chambers in a battery. In one embodiment, by controlling electrolyte temperature the system controls the temperature of a battery. In one embodiment, by controlling flow rate of electrolyte in a battery and/or controlling a heat exchanger, a system controls the temperature of a battery and thereby controls a voltage of the battery.

Generally, the performance of a metal-air cell or battery is determined by various parameters such as cathode composition and structure, anode composition and structure, electrolyte composition, working temperature, electrolyte flow rate, air flow rate, discharge profile, etc. While some of the parameters such as physical structure and composition of elements, e.g., cell or battery structure and cathode composition, are determined by the cell or battery design and/or manufacturer, other parameters, such as working temperature, drawn current, voltage and a discharge profile, may be measured and set by an embodiment of the invention. It will be understood that various designs or battery types may be used according to embodiments of the invention and that embodiments of the invention may be applicable to any suitable battery. For example, batteries of various sizes, number of cells and the like may be applicable and used without departing from the scope of the present invention.

An embodiment of the invention may compensate for, or take into account, design parameters and/or evolution of a battery's construction or composition. For example, the distance between the anode and the cathode is changing throughout the operation of a metal-air cell or battery. As the anode is consumed, the distance between its surface and the cathode increases. Such and other changing parameters determine the cell's or battery's effective voltage and effect the corrosion rate during operation, as well as effecting electrolyte utilization. These parameters, in turn, determine the energetic utilization of the cell or battery. An embodiment may adjust working parameters (e.g., temperature of, or power consumption from a battery) based on changing or evolving parameters. For example, a system compensates for a decrease in voltage produced by a metal-air battery (e.g., a decrease resulting from corrosion) by increasing the temperature of the battery.

A working point of a cell or battery may be defined by the electric current that is being drawn from the cell or battery, and the cell's or battery's temperature. Typically, low currents result in higher cell or battery voltage, but also in increased corrosion, and therefore decreased columbic efficiency. Lower temperatures result in lower voltage, but also result in reduced corrosion, and therefore increased columbic efficiency. Therefore, there is a tradeoff between higher voltage and higher columbic efficiency, which essentially leads to the total energetic efficiency of the cell or battery.

At a given moment, for a given discharge power, an optimal working point of a cell or battery may be determined by the cell's or battery's properties, and by the "age" of the electrolyte. An age of an electrolyte as referred to is the amount of metal (e.g., aluminum, zinc, etc.) that is dissolved in the electrolyte. In some cases, an age of an electrolyte is calculated based on the percentage or ratio of dissolved metal in the electrolyte.

An embodiment may determine a current or instantaneous rate at which metal is dissolving. For example, in an embodiment, release of Hydrogen from an electrolyte is continuously measured by a sensor and a controller uses Hydrogen release level or rate to determine a rate at which metal from an anode is dissolving into the electrolyte. For example, based on equation (2) above, a controller uses the rate by which Hydrogen is released in a battery to calculate the rate by which metal is dissolving in the electrolyte. Accordingly, the rate by which an electrolyte is aging is calculated by a controller. By continuously monitoring an aging of an electrolyte, a controller can readily determine an age of an electrolyte at any given point in time. As further described herein, a system may cause a battery to operate such that the rate by which Hydrogen is released, the rate by which an anode is consumed and/or the rate by which the electrolyte in a battery is aging are kept at a minimum or at any desirable rate or level.

Working at an optimal point (e.g., defined by drawn current, and temperature) may be reflected in the cell's or battery's voltage. For example, a desirable voltage in a range of 1 v to 1.25 v may be maintained by an embodiment by controlling working parameters as described herein. It will be understood that, where applicable, any discussion of a cell is relevant to a battery that includes one or more cells. For example, a discussion of energy utilization of a cell is relevant to a plurality of cells in a battery and is thus to be understood as a discussion of energy utilization of a battery. Likewise, a discussion of heating or cooling an electrolyte or cell is to be understood as a discussion of heating and/or cooling a plurality of cells in a battery. Accordingly, and for the sake of simplicity and clarity, cells may be referred to herein when a battery is relevant and vice versa.

Reference is made to FIG. 1, which graphically depicts parameters that affect the energetic utilization of a metal-air cell or battery and the interdependencies between such parameters. As discussed, parameters such as anode composition, cathode composition, cathode structure, geometrical design and the like (collectively referred to herein as "design parameters") typically effect or influence the energetic utilization of a cell or battery. Such parameters are omitted from FIG. 1. As described herein, an embodiment may measure, evaluate and compensate for changes in design parameters of a battery.

To further describe the relations shown in FIG. 1, increased electrolyte age (for example, in the range of 0 to 200 gram of aluminum per liter of electrolyte) causes lower voltage but also causes lower corrosion rate, and therefore may increase or decrease the energetic utilization, depending on the specific working conditions. Increased current (typically 0 to 400 milliampere (mA) per square centimeter ($cm^2$) of cathode) causes lower voltage, but also causes reduced corrosion, and therefore may also increase or decrease the energetic utilization. Increased temperature (typically 0 to 90 degrees Celsius (° C.)) increases the voltage, but also increases corrosion, and therefore may also increase or decrease the overall energetic utilization.

FIG. 1 shows the inter-relations between working parameters. By controlling some of the parameters shown in FIG. 1 (e.g., current draw, voltage, temperature, corrosion rate, circulation rate and electrolyte age) the parameters through which a required result is achieved may be controlled. For example, to control corrosion rate, a system controls a working temperature of a battery. For example, corrosion rate may be decreased by decreasing the temperature of a battery as described herein. In one embodiment, a system controls one or more of: a current draw, a temperature, a corrosion rate and an electrolyte age of a battery such that, with respect to a metal-air battery, at least one of: a desired energetic utilization, an instant power draw, a specific voltage or a utilization profile are achieved and/or maintained.

For example, in a typical battery, when a constant power draw (in the form of a product of voltage and current denoted by P=VI) is required, maximal utilization may be achieved by keeping the cells' voltage V in the range of 1-1.25 volts, and setting the current I that will yield the required power P according to this voltage. In one embodiment, during operation and as the age of the electrolyte increases, a controller included in a system causes a heat exchanger to increase, in a controlled manner, the temperature of the electrolyte or battery (e.g., by heating the electrolyte and/or changing circulation rate of the electrolyte) such that the voltage and the corrosion rate are maintained at a predefined or suitable range. The corrosion rate may also be determined according to the rate of hydrogen release from the battery. Consequently, a momentary utilization ratio of the battery may be determined by calculating the value utilization ratio=(1−corrosion rate)×cell voltage/the theoretical voltage of the cell's reaction (For example, for aluminum, the theoretical voltage is 2.71 v, as shown in equation (1), and for zinc the theoretical voltage is 1.65 v). At any given moment, a controller may change the temperature of the battery (e.g., by activating or controlling a heat exchanger) and the power draw from the battery (e.g., by controlling a current regulator), such that a value of a utilization ratio is maximized.

Accordingly, the current invention enables increasing the energetic utilization of a metal anode and an electrolyte in a metal-air battery by controlling operational parameters. For example, an embodiment controls parameters such as a working temperature of a battery, an amount or magnitude of current drawn from a battery, the voltages supplied by a battery, an age of an electrolyte in a battery etc.

The system may control the working point of a metal-air battery by controlling the working temperature. The system may control the working point of a metal-air battery by controlling the current drawn from the battery. Consequently, the voltage of the battery is also determined or controlled. The system may consist of a controller, a heat exchanger, a current regulator, and various sensors such as a voltage sensors, a PH sensor, a conductance sensor, a density sensor, a turbidity sensor, a Hydrogen sensor, etc. The system may be adapted to control cell's or battery's temperature by means of the heat exchanger, and may control the current drawn from a cell or battery by means of the a current regulator.

A system may determine the age of the electrolyte in one or more of the following manners: monitoring and summing the metal anode consumption, calculating the metal anode consumption, measuring or calculating corrosion rate based on Hydrogen release, measuring electrolyte conductivity, measuring electrolyte PH level, measuring electrolyte density, measuring electrolyte turbidity, measuring electrolyte viscosity etc.

As referred to herein, a discharge profile is characterized or defined by the discharge current and voltage vs. the amount of metal (e.g., aluminum, zinc any other metal suitable for metal air batteries) dissolved into the electrolyte. A cell or battery may be tested under various conditions in order to determine the cell's or battery's capacity or behavior under various loads and conditions. For example, a manufacturer of a battery may provide parameters, values or graphs that characterize a battery and its expected performance. An embodiment may define a discharge profile for a battery such that the discharge profile matches a desired performance. For example, on certain circumstances, a discharge profile that leads to maximal energetic utilization may be required, and on other circumstances, a profile that leads to lower energetic utilization, but gives higher power, may be preferred.

Data characterizing a battery may be provided to a controller and used, the controller when controlling operation of a metal-air battery. For example, if data provided by a manufacturer indicates an optimal temperature for a battery then a controller may cause the battery to operate in the optimal temperature. For example, in one case, a controller continuously monitors and adjusts working parameters of a battery such that a selected discharge profile is executed. In another embodiment, a system continuously monitors and adjusts working parameters of a battery such that a required utilization ratio is maintained. In yet another example, a system continuously monitors and adjusts working parameters of a battery such that a required power is supplied, while utilization ratio is maintained.

Figure 2:
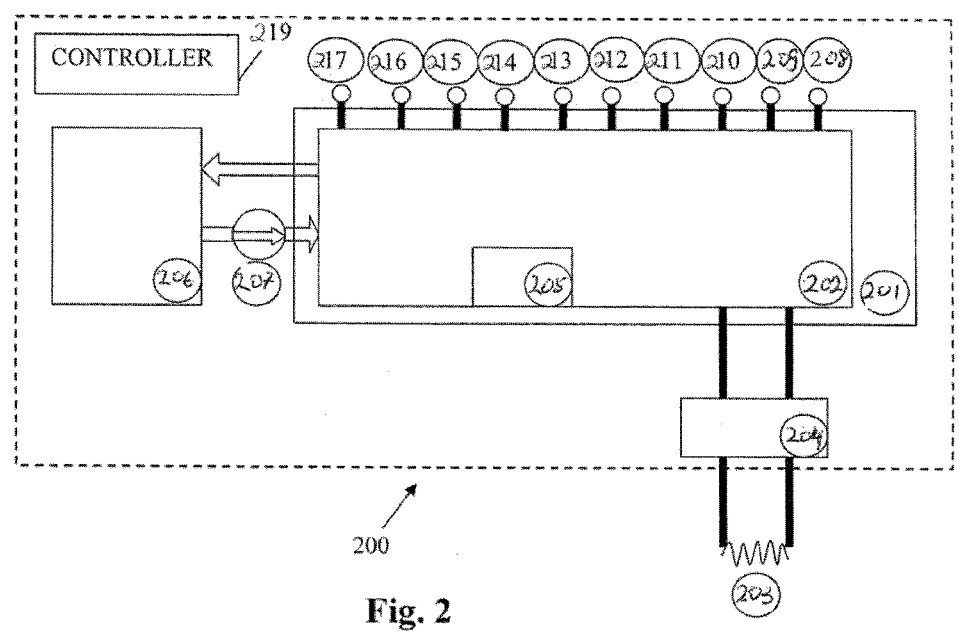
FIG. 2 shows an exemplary system according to embodiments of the invention.

Reference is made to FIG. 2, a high level block diagram of an exemplary system 200 according to embodiments of the present invention. As shown in FIG. 2, a system may include a metal-air battery 201 that is supplying energy to a load 203. For example, the load may be an electric motor in a vehicle, light bulbs, or any other electric power consuming entity. It will be understood that embodiments of the invention are not limited to a specific load to which electric energy is provided and any load may be used without departing from the scope of the invention. For example, a vehicle as referred to herein may be an electric car, a toy, a boat or a plane of any size. A vehicle may be a manned or unmanned vehicle.

As shown, battery 201 may include a metal-air cell (for example, an aluminum-air cell) 202. For the sake of simplicity and clarity, only one metal-air cell 202 is shown in battery 201, however, it will be understood that any suitable number of cells 202 may be used according to embodiments of the invention. For example, the number of cells may be chosen based on a desired voltage to be provided by battery 201. It will be understood that discussion of cell 202 herein is applicable to any number of cells 202 in a battery 201. For example, parameters measured for cell 202 may be measured for a plurality of cells, parameters set or controlled for cell 202 (e.g., voltage, current draw, heat, circulation etc.) may be set for a plurality of cells 202 in battery 201.

As shown, a system may include a heat exchanger 205 that may cool or heat a battery, cells or electrolyte included in battery 201. For the sake of clarity, electrolyte included in battery 201 is not shown, however, it will be understood that any space in battery 201 or cell 202 may be filled with electrolyte. For example, in an embodiment, heat exchanger 205 is placed in a chamber through which electrolyte flows. Accordingly, a system may heat or cool the electrolyte in a battery thus heat or cool a battery. The electrolyte may flow through cell 202 thus cooling or heating cell 202. In an embodiment, controller 219 controls operation of heat exchanger. For example, controller 219 receives a temperature measurement from temperature sensor 208 and controls heat exchanger 205 such that a desired temperature of an electrolyte in battery 201 (and consequently, temperature of battery 201) is achieved and/or maintained.

In an embodiment, by controlling switches valves and the like (not shown), controller 219 may cause heat exchanger 205 to heat or cool cell 202 by causing cooled or heated electrolyte to flow through cell 202. In other embodiments, heating or cooling may be done using a fan, an electric element, a radiator, a fan external to battery 201 and the like. Controller 219 may control any heating or cooling device, system or component that may be internal or external to battery 201. For example, a fan and heating element component may be placed outside battery 201 and may be controlled by controller 219 such that it cools or heats battery 201 or cell 202. In another embodiment, an electric heating element controlled by controller 219 may be placed in battery 201 such that it can heat electrolyte in battery 201.

For the sake of clarity, the electrolyte included in system 200 is not shown. However, it will be understood that electrolyte may be present inside battery 201, inside cell 202 and in electrolyte tank 206 and may be made to reach, or flow to or through any part of system 200 as required, e.g., using tubes, orifices and the like.

As shown, system 200 may include an electrolyte tank 206 and a pump 207. Pump 207 may circulate electrolyte through system 200. In an embodiment, controller 219 controls operation of pump 207. For example, controller 219 causes pump 207 to transfer electrolyte from electrolyte tank 206 to cells in battery 201 or cause pump 207 to transfer electrolyte from battery 201 to electrolyte tank 206. Controller 219 may control the capacity of pump 207, e.g., configure pump 207 to circulate, between electrolyte tank 206 and battery 201, a first volume of electrolyte per second, during a first period of time and configure pump 207 to circulate a second volume of electrolyte per second during a second period of time. Accordingly, controller 219 controls the rate of circulation of electrolyte through system 200.

In another embodiment, in order to remove deposits of matter from a cathode or anode in cell 202, controller 219 controls pump 207 and heat exchanger 205 such that a desired combination of circulation and temperature is achieved. For example, to remove deposits of matter from an aluminum anode in cell 202, controller 219 may first cause heat exchanger 205 to heat electrolyte in electrolyte tank 206 or electrolyte in battery 201 and, when the proper or desired temperature of the electrolyte is reached, controller 219 activates pump 207 thus causing warm or hot electrolyte to circulate through cell 202 and efficiently remove deposits of matter from the anode in cell 202. It will be noted that heat exchanger 205 may be placed in battery 201 as shown, in electrolyte tank 206 or two heat exchangers may be used, installed in both battery 201 and electrolyte tank 206.

In one embodiment, prior to activating or re-activating the battery, controller 219 determines the age of electrolyte before activating the battery (e.g., by pumping electrolyte into the cells), controller 219 sets the temperature of the electrolyte to a predefined value. For example, based on a profile or specification, controller 219 sets the temperature of the battery such that an optimal utilization of the electrolyte is achieved. For example, controller 219 warms the electrolyte in tank 206 and only when the electrolyte reaches a predefined temperature (e.g., as defined in a profile and/or based on the age of the electrolyte) does controller 219 commands pump 207 to circulate electrolyte through battery 201 and/or cell 202.

For example, in one embodiment, in order to restart or reactivate a battery, the operation of which was terminated or stopped before the electrolyte was completely utilized, controller 219 controls pump 207 and heat exchanger 205 such that a desired combination of circulation and temperature is achieved.

For example, to restart a battery that was stopped (e.g., disconnected from a load) at a time when the electrolyte was at a temperature of 60 degrees Celsius (60° C.), controller 219 first causes heat exchanger 205 to heat electrolyte in electrolyte tank 206 and/or electrolyte in battery 201 and, when the temperature of the electrolyte reaches 55-65 degrees Celsius (55-65° C.), controller 219 activates pump 207 thus causing warm or hot electrolyte to circulate through cell 202, thus restarting the battery with the correct temperature corresponding to the age of the electrolyte.

As shown, system 200 may include a temperature sensor 208, a voltage sensor 209, a current sensor 210, a flow rate sensor 211, a pressure sensor 212, a conductivity sensor 213, a PH sensor 214, a density sensor 215, a turbidity sensor 216, and a hydrogen sensor 217. It will be understood that some of the sensors shown included in system 200 may be optional. For example, some embodiments may not include all sensors shown. Likewise, embodiments of the invention may include sensors not shown in FIG. 2 that may be used to monitor aspects of battery 201. For the sake of clarity, a single sensor of each type is shown but it will be understood that a plurality of sensors of the same type may be included in system 200. For example, a plurality of voltage sensors 209 may be connected to a plurality of cells 202 in a battery 201.

In an embodiment, temperature sensor 208, voltage sensor 209, current sensor 210, flow rate sensor 211, pressure sensor 212, conductivity sensor 213, PH sensor 214, density sensor 215, turbidity sensor 216 and hydrogen sensor 217 are operatively connected to controller 219 such that signals or output generated by these sensors are provided to controller 219. Using parameters measured, sensed or monitored by the sensors, controller 219 may determine a state of battery 201 and may command components in system 200 such that a desired operational or other state of battery 201 is reached and/or maintained.

The above mentioned sensors may be any suitable sensors as known in the art. It will be understood that embodiments of the invention are not limited by the type, nature, or way of operation of any of the described sensors. Various other sensors may be included in a system as required. For example, in order to determine an age of an electrolyte in a battery, a viscosity sensor may be added and controller 219 may use data related to a viscosity or thickness of the electrolyte in order to determine its age or quality.

In an embodiment, controller 219 controls the temperature of battery 201 by activating heat exchanger 205 and monitoring the temperature of battery 201 based on input received from temperature sensor 208, and, when a desired temperature is achieved, controller 219 stops operation of heat exchanger 205. In another example, using input from a thermometer that measures ambient temperature (e.g., one installed in a car), controller 219 may cause or command heat exchanger 205 to provide a constant heat such that the temperature of battery 201 is maintained at a predefined or desirable temperature range.

Controller 219 may be connected to any sensor or unit, e.g., units external to system 200. For example, when installed in a vehicle, controller 219 may be connected to sensors or units that provide data related to a speed at which the vehicle is traveling, an altitude, a temperature outside the vehicle, engine temperature and the like. Any information collected or obtained by controller 219 from any applicable unit, component or sub-system in a vehicle may be used by controller, where applicable, to control an operation of a battery as described herein. For example, the above mentioned information my allow controller 219 to determine how much power a vehicle is expected to require from its electric energy source, and adjust working parameters of the metal-air battery to deliver required power while maintaining its efficiency.

In one embodiment, controller 219 controls the amount of energy that is drawn from, or supplied by, battery 201 by controlling current regulator 204. For example, if, based on a profile, a constraint, a condition or a configuration parameter, controller 219 determines that current drawn from battery 201 is to be limited, then controller 219 uses current regulator 204 in order to limit electric current being drawn from battery 201. For example, current regulator 204 may be a variable and controllable resistor or a DC to DC convertor controlled by controller 219 such that current flowing from battery 201 to load 203 is kept at a desired level or magnitude.

In one embodiment, data related to attributes, characteristics and/or properties of battery 201 are provided by a manufacturer of battery 201 and may be used. For example, capacity, power and voltage (and interdependencies between these parameters) of battery 201 may be obtained from the manufacturer, and a profile that is best used with a specific battery 201 may be generated using such attributes.

In one embodiment, a battery or cell may be tested prior to being operated as described herein. For example, each cell in battery 201 may be tested in various working conditions (e.g., with each of a current, voltage and/or temperature held at various values), in order to determine a discharge curves of the cell. Various curves may be tested and analyzed to determine the performance features that may be realized. A number of charge/discharge curves may be selected for use. For example, a first selected curve may be energetically optimal and a second selected curve may be power optimal. Controller 219 may be provided with selected curves or discharge profiles for a battery and may use provided curves in order to control operation of battery 201. For example, controller 201 controls the temperature of battery 201 and/or current being drawn from battery 201 as described herein such that a selected curve or profile is maintained.

System 200 may control operation of a battery such that a predefined operational profile is executed or maintained. For example, a discharge profile characterized by the discharge current and voltage with respect to the amount of metal dissolved into the electrolyte may be achieved. For example, using data received from one or more sensors, controller 219 determines the age of an electrolyte in battery 201. For example, by measuring density, PH, hydrogen and/or turbidity of an electrolyte with respect to time and usage (e.g., in a lab), the electrolyte is profiled such that for specific levels of density, PH, hydrogen and/or turbidity and based on an electrolyte profile, the age of the electrolyte may be determined. Accordingly, in one embodiment, provided with an electrolyte profile and data from attached sensors, controller 201 determines the age of the electrolyte.

In one embodiment, a discharge profile defines the discharge current and voltage. To cause battery 201 to operate according to a specific discharge profile, controller 219 uses current regulator 204 to set the current being drawn from battery 201 to the value defined in the discharge profile. In an embodiment, to cause battery 201 to operate at the voltage level defined by a discharge profile, controller uses heat exchanger 205. As described, voltage provided by battery 201 may be raised by raising the temperature of battery 201 and cooling battery 201 will cause a decrease in provided voltage. Accordingly, in one embodiment, controller 219 causes heat exchanger 205 to heat or cool battery 201 so that the voltage defined in the discharge profile is achieved.

Controller 219 may monitor all aspects related to a profile and concurrently or simultaneously control a plurality of units such that each of a plurality of characteristics may be maintained. For example, while monitoring the voltage of battery 201 and causing heat exchanger 205 to heat battery 201 in order to raise the voltage controller 219 may monitor the current being drawn (using current sensor 210) and if, with rising temperature, the current drawn is increased above the current defined in the discharge profile, controller 219 may cause current regulator 204 to limit current drawn from battery 201. Accordingly, controller 219 may simultaneously monitor and control a plurality of operational characteristics of battery 201. In another embodiment, controller 219 may iterate over a plurality of parameters or characteristics, setting each one in turn and repeating the process until the discharge or other profile is reached and maintained for a period of time or until the state of the system changes.

For example, first, controller determines the age of the electrolyte. Next, by controlling current regulator 204, controller 219 sets the current drawn from battery 201, then, controller 219 uses heat exchanger 205 to raise or lower the supplied voltage, controller 219 then repeats the steps of determining the electrolyte age, setting the current and setting the voltage. In one embodiment, controller 219 repeats the steps of determining the electrolyte age, setting the current and setting the voltage until a predefined discharge profile is reached. In another embodiment, controller 219 repeats the steps of determining the electrolyte age, setting the current and setting the voltage continuously such that adherence to a discharge (or other) profile is continuously maintained.

In another example, a specific relation between the amount of electric energy that is extracted from each Kg of metal and the total energy in each Kg of metal in battery 201 is maintained, this relation is referred to herein as a utilization ratio. In an embodiment, controller 219 monitors at least one of the voltage and current supplied by battery 201 (e.g., as described herein) to determine a current or momentary energetic utilization. In an embodiment, to achieve a desired utilization ratio, controller 219 determines the age of the electrolyte in battery 201, e.g., as described herein. By controlling heat exchanger 205, controller 219 then sets the voltage supplied by battery 201, e.g., as described herein.

In one embodiment, controller 219 examines data received from hydrogen sensor 217 and, using heat exchanger 205, causes an increase or decrease of the temperature of battery 201 such that the hydrogen evolution or release corresponds to a desired rate, e.g., as defined in a profile. As described, the level of hydrogen in the electrolyte may be indicative of the rate at which metal is consumed without providing electricity. Accordingly, in order to maintain a specific relation between energy and consumed metal, a system may monitor hydrogen levels in the electrolyte and adjust working parameters such that the relation is maintained. The operations performed to achieve a predefined ratio of energy to metal consumption may be performed sequentially or concurrently. The operations performed to achieve a predefined ratio of energy to metal consumption may be repeated continuously (e.g., in a loop) such that the ratio is continuously maintained.

System 200 may cause battery 201 to operate according to a mix of profiles or according to any combination of constraints or characteristics. In an exemplary embodiment or case, system 200 causes battery 201 to operate such that a specific, required or predefined power is supplied and a specific or defined utilization ratio is maintained. For example, controller 219 sets the current drawn to a first level (e.g., using current regulator 204). Next, controller 219 sets the operating voltage such that the required power is achieved. As known in the art, a number of combinations of current and voltage values or levels may be used to achieve a specific power. In one embodiment, to achieve both a specific power and a specific utilization ratio, controller 219 monitors the hydrogen evolution rate and increase or decrease the temperature of battery 201 such that the hydrogen evolution rate corresponds to the rate defined by the utilization ratio. Accordingly, in order to achieve both a predefined power and a specific utilization ratio, controller may adjust any one of a current drawn from a battery, a voltage provided by the battery and an operating temperature of the battery. In one embodiment, controller 219 continuously monitors the age of an electrolyte in battery 201, power drawn from battery 201 and the temperature of battery 201 and, taking into account the age of the electrolyte, continuously adjusts power drawn and temperature such that operational characteristics as defined are maintained.

Controller 219 may be connected to any applicable unit or component and may adjust working parameters of battery 201 according to any applicable conditions. For example, when system 200 is installed in a vehicle, speed of movement of the vehicle, controls from a driver, engine operational state, supplementary power sources and the like may all be taken into account. For example, controller 219 may receive input form sensors inside the car, the communication line in the car, sensors mounted on the engine or motor of the car, and sensors attached to an auxiliary source.

Controller 219 may use input from a driver of a car in which system 200 is installed and input from an engine or other components in the car and input from an auxiliary battery in order to set working characteristics or profiles of battery 201. Controller 219 may dynamically cause battery 201 to operate according to a current or instantaneous condition or requirement.

For example, when a driver steps on the acceleration pedal of an electrically operated car, controller 219 may switch from a utilization profile to a power surge profile where the power surge profile may not be best in terms of energetic utilization of battery 201 but may be best in terms of power. In another case, determining an auxiliary battery (e.g., electric power source 320 described below with reference to FIG. 3) is fully charged, and, in order to maintain energetic utilization as defined in a profile, controller 219 may decrease power drawn from battery 201 and allow the auxiliary battery to provide power.

In an embodiment, controller 219 automatically adjusts working parameters of battery 201 such that an optimal usage of battery 201 is achieved. For example, in one embodiment, by receiving signals from a tachometer and/or a speedometer in an electric car, controller 219 may deduce that the car is stationary or that low power is required. In such case, controller 219 may switch to an operational mode that best preserves the life of battery 201, e.g., cause battery 201 to operate according to a low power and high utilization profile as described.

Figure 3:
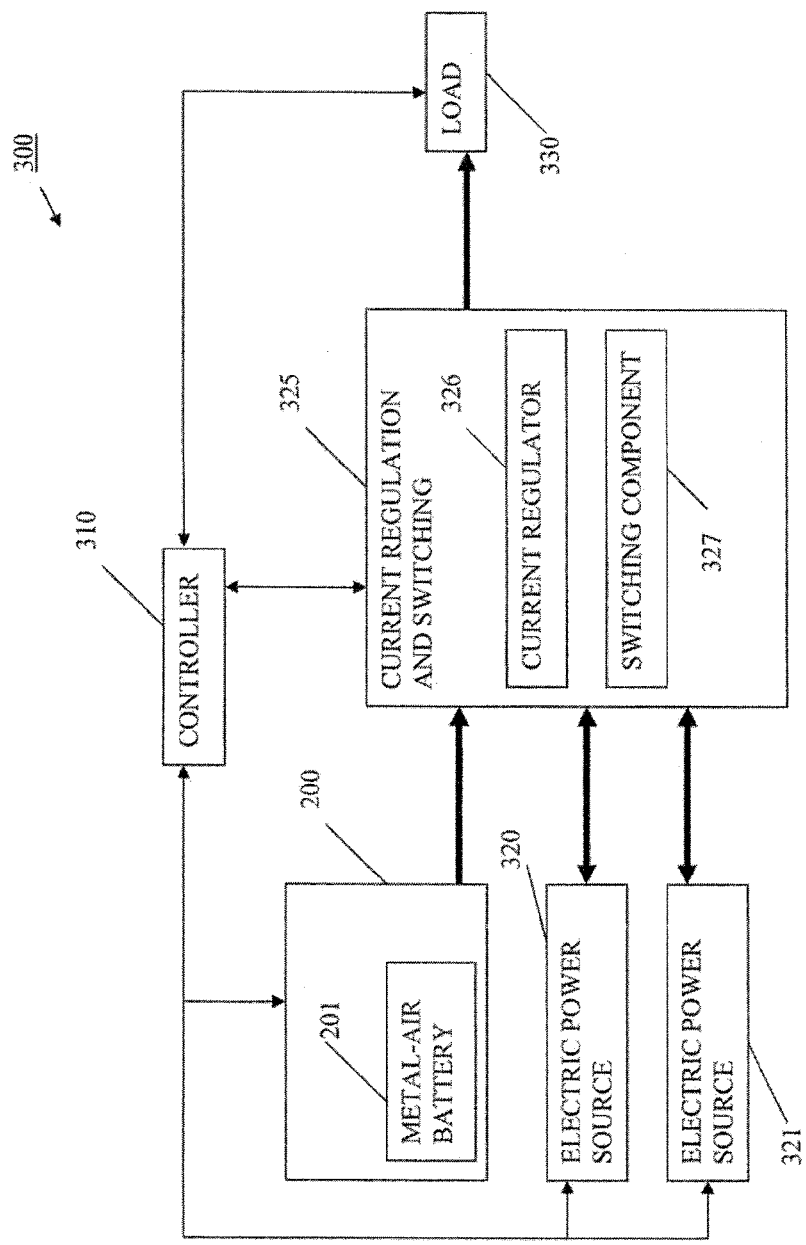
FIG. 3 shows an exemplary system according to embodiments of the invention.

Reference is made to FIG. 3, an exemplary system 300 according to embodiments of the invention. As shown, system 300 may include a system 200 as described herein, including a metal-air battery 201. For the sake of simplicity and clarity, other components of system 200 are not shown in FIG. 3. As shown, system 300 may include a controller 310 that may be similar to controller 219. In an embodiment, controller 219 may be replaced by controller 310. When replacing controller 219, controller 310 may be connected to any sensor connected to controller 219 as described herein. In other embodiments, e.g., when both controllers 219 and 310 are included in system 300, controller 310 may communicate with controller 219 and receive any data received or obtained by controller 219. Accordingly, it will be understood that any operations described herein with respect to controller 219 may be performed by controller 310.

In one embodiment, controllers 219 and 310 include a processor and memory. A non-transitory memory connected to controller 310 may store a set of instructions that when executed by controller 310 cause controller 310 to perform operations and methods described herein. In an embodiment, a non-transitory memory unit connected to controller 310 stores discharge or other profiles described herein.

As further shown, system 300 may include a plurality of power sources 320 and 321. For example, power source 320 may be a rechargeable battery or a super capacitor as known in the art and power source 321 may be a solar power source. For the sake of simplicity, other than metal-air battery 201, only two power sources 320 and 321 are shown. However, it will be understood that any number of power sources may be included in system 300, may be connected to current regulation and switching unit 325 and may be controlled by controller 310. As shown, system 310 may include a current regulation and switching unit (CRSU) 325. As shown, CRSU 325 may include a current regulator 326 and a switching component 327.

For example, current regulator 326 may be similar to current regulator 204 but may be configured to regulate current flow from/to any power source or load connected to CRSU 325. Current regulator 326 may include a plurality of current regulators and may, accordingly, regulate currents in multiple paths. For example, in one embodiment, current regulator 326 is adapted to set different current limits for different paths. For example, in one embodiment, based on a control from controller 310, current regulator 326 sets a first limit on current flowing from system 200 to load 330, sets a second limit on current flowing from system electric power source 320 to load 330 and further sets a third limit on current flowing from power source 321 to power source 320.

Switching component 327 may be a component configured to electrically connect and/or disconnect any component or unit connected to CRSU 325. For example, switching component 327 may establish a first electric connection between power source 320 and load 330 and further establish a second connection between system 200 and power source 320. Accordingly, CRSU 325 may route electric current from/to any connected component or unit and may further regulate the current flows to/from any connected component or unit.

For example, CRSU 325 may connect electric power source 321 to load 330 and, at the same time, connect system 200 to electric power source 320. Switching component 327 may include a plurality of electrically operated switches and, using such switches, switching component 327 may enable electrically connecting/disconnecting any attached electric power source (including system 200) to/from any other electric power source. Similarly, switching component 327 may electrically connect/disconnect any attached electric power source to/from load 330. Accordingly, using power regulator 326, CRSU 325 may enable controlling the current being drawn from any one of the electric power sources connected thereto and, in addition, using switching component 327, CRSU 325 may direct electric current from any connected power source to any connected power source or to load 330. It will be understood that a plurality of loads may be connected to CRSU 325.

In one embodiment, based on a control signal from controller 310, CRSU 325 may cause system 200 to provide a predefined or specific power to load 330 and further cause electric power sources 320 and 321 to provide any additional power required. In another case, if power required by load 330 is less than can be provided by system 200, then, based on a control signal from controller 310, CRSU 325 may cause system 200 to provide electric power to one or both of power sources 320 and 321. For example, if power source 320 is a rechargeable battery then, if the electric power or current that can be provided by system 200 is more than required by load 330, than, based on a control signal from controller 310, CRSU 325 may cause system 200 to provide electric power to power source 320 such that system 200 charges power source 320.

Although not shown, any relevant sensors may be installed on any one of power sources 320 and 321 and load 330 and installed sensors may be connected to controller 310. For example, sensors similar to those shown in FIG. 2, e.g., a voltmeter, may be installed in power sources 320 and 321. Accordingly, controller 310 may be aware of a state or condition of components in system 300 and may control CRSU 325 based on a state of any one of system 200, load 330 and power sources 320 and 321. For example, if power source 321 is a solar power source and power source 320 is a rechargeable battery, then, based on a control signal from controller 310, CRSU 325 may cause power source 321 to charge power source 320 or provide power to load 330. In another time or case, based on a control signal from controller 310, CRSU 325 may cause power source 321 to both charge power source 320 and provide power to load 330.

In one embodiment, controller 310 periodically or continuously monitors, determines and/or calculates working conditions of battery 201. For example, controller 310 monitors, based on input from sensors described herein, a temperature of battery 201, current drawn from battery 201 and voltage of battery 201. In one embodiment, controller 310 periodically or continuously monitors, determines and/or calculates the age of an electrolyte in battery 201 as described herein. In one embodiment, controller 310 periodically or continuously monitors, determines and/or calculates an energetic utilization of battery 201.

For example, using data from hydrogen sensor 217, controller 310 determines corrosion rate as described. In another embodiment, controller 310 uses a current density value. A current density as known in the art is a measure of electric current per volume or per cross-sectional area. For example, the current density of a metal in metal-air battery 201 may be provided to controller 310, e.g., store in a memory accessible to controller 310. By considering the current density and temperature of battery 201 and the age of the electrolyte in battery 201, controller 310 determines the energetic utilization of battery 201. For example, controller 310 uses a lookup table (e.g., provided by b manufacturer of battery 201) in order to determine the energetic utilization based on an age of the electrolyte, a current density and/or temperature of battery 201.

In one embodiment, to achieve a desired or optimal energetic utilization, controller 310 observes the voltage of battery 201 (using voltage sensor 209) and tunes a system to the voltage that produces the right or optimal efficiency in terms or energetic utilization. For example, using current regulator 326, controller sets the current drawn from battery 201 to a constant level or rate and then uses heat exchanger 205 to set the temperature of battery 201 such that the a desired voltage provided by battery 201 is achieved. As described herein, in one embodiment, the voltage provided by battery 201 is controlled by controlling the temperature of battery 201. Accordingly, controller 310 controls the current drawn from battery 201 and the voltage of battery 201 such that a desired energetic utilization is achieved and maintained.

In one embodiment, controller 310 causes battery 201 to operate such that an optimal utilization is achieved. For example, after determining conditions of battery 201, such as temperature, current drawn and voltage and further calculating the momentary energetic utilization of battery 201, controller 310 adjusts working parameters or conditions of battery 201 as described. For example, controller 310 increases or decreases current drawn from battery 201, increases or decreases the voltage or temperature of battery 201 as described herein such that a desired working point is reached For example, consider an aluminum-air cell with fresh electrolyte at a temperature of 50° C., running at a current density of 200 ma/cm$^2$, a voltage of 1.1V, and a corrosion rate of 10%. A voltage efficiency parameter is calculated by dividing a current voltage of the cell by the theoretical voltage that can be provided by the cell, e.g., 1.1/2.7 for Aluminum.

The momentary energetic utilization rate is calculated by controller 310 as the product of the "columbic efficiency" and "voltage efficiency". In this example, the momentary energetic utilization is 0.366 according to: $0.9 \times (1.1V/2.7V) = 0.366$. To increase the energetic utilization, controller 310 increases the current density to 250 ma/cm$^2$ (by controlling current regulator 326) and therefore, the corrosion rate drops to 1%, and the voltage drops to 1.05 v. Accordingly, the energetic efficiency is increased from 0.366 to $0.99 \times (1.05V/2.7V) = 0.385$.

Figures 6A, 6B:
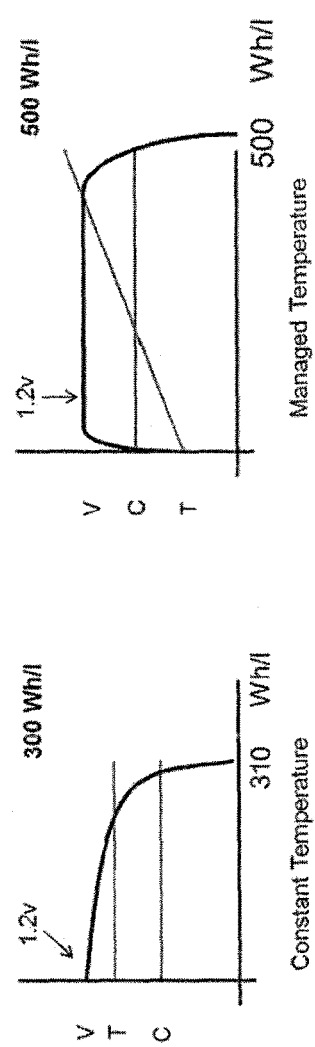
FIGS. 6A and 6B illustrate a behavior of a temperature controlled metal-air battery according to embodiments of the invention.

Reference is made to FIGS. 6A and 6B that illustrate a behavior of a temperature controlled metal-air battery. FIGS. 6A and 6B illustrate an increase in energetic efficiency according to embodiments of the invention. In both graphs shown by FIGS. 6A and 6B, the current drawn from a battery is constant throughout the discharge. As shown by FIG. 6A, when the temperature is constant, the battery voltage continuously drops with the age of electrolyte (expressed in Watt Hour per liter of electrolyte (Wh/liter)), and, as shown, at 310 Wh/liter the electrolyte is exhausted. As shown by FIG. 6B, when the temperature of the electrolyte is gradually increased, and a voltage of 1.2 v is maintained through the discharge. The heated electrolyte is only exhausted after drawing 500 Wh/liter of electrolyte. Accordingly, by controlling the temperature of a battery, a system according to embodiments of the invention dramatically increases the utilization of electrolyte in a metal-air battery.

Figure 4:
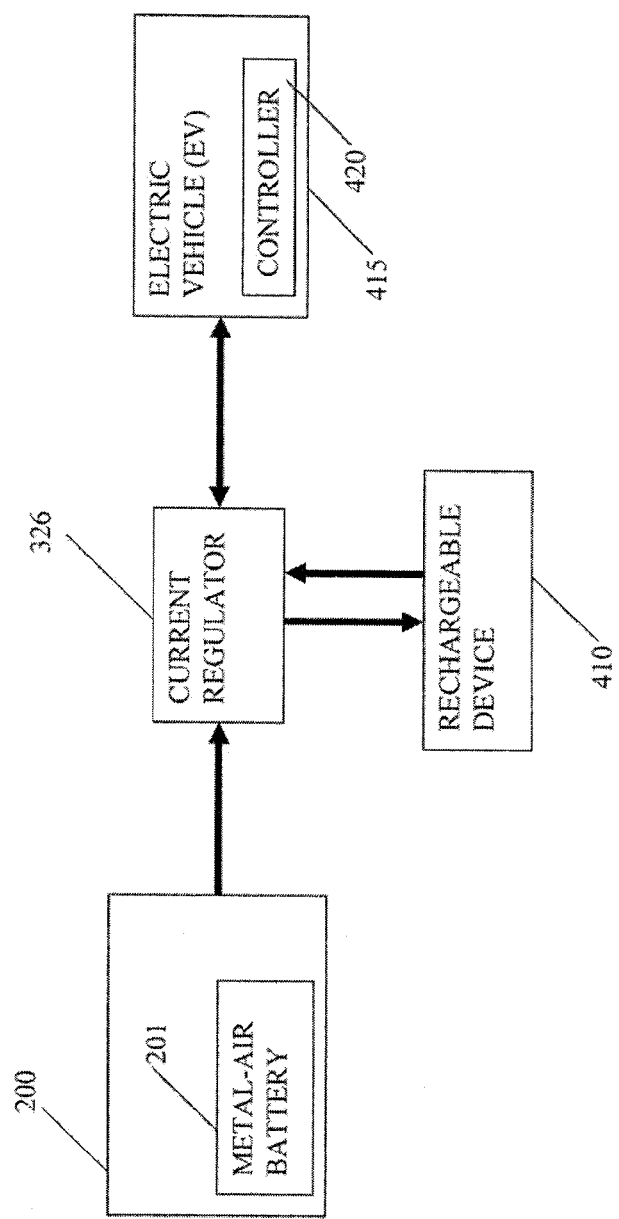
FIG. 4 shows an exemplary system configuration according to embodiments of the invention.

In one embodiment, load 330 is an electric vehicle (EV) and electric power source 320 is a rechargeable battery. Reference is additionally made to FIG. 4, which shows an exemplary configuration that may be assumed or achieved by system 300. In one embodiment, the configuration shown in FIG. 4 is achieved by configuring CRSU 325. For example, controller 310 causes CRSU 325 to connect system 200 to rechargeable device 410 (that may be electric power source 320) through current regulator 326 and further configures CRSU 325 to connect rechargeable device 410 to EV 415 as shown. In another embodiment, permanent or fixed connections may used to configure a system as shown by FIG. 4.

In one embodiment, when used in an electric vehicle 415, a metal-air battery 201 is connected to a rechargeable device 410 which in turn is connected to the vehicles drive system. In this embodiment, controller 310 causes energy to be drawn from battery 201 at a constant rate. In an embodiment, the constant rate is determined by calculating an average energy level or rate consumed by EV 415. For example, controller 310 periodically or continuously measures current provided to EV 415 by both battery 201 and rechargeable device 410, and periodically or continuously calculates and average energy required to operate EV 415. In one embodiment, controller 310 causes battery 201 to provide the calculated average current or energy and uses rechargeable device 410 as a buffer that supplies additional power when EV 415 requires more than the average power, and absorbs power when EV 415 requires less than the average power. For example, battery 201 provides power for a normal drive but when EV accelerates and more than the average power is needed, rechargeable device 410 provides the additional required power. In one embodiment, when electric energy is generated by EV 415 rather than consumed, e.g., by regenerative breaking as known in the art, the electric energy generated by EV 415 is used to charge rechargeable device 410.

As shown by FIG. 4, in an exemplary configuration, system 200 is connected to a rechargeable device or battery 410 through a current regulator (e.g., current regulator 326). In one embodiment, the rechargeable device 410 is connected to EV 415 thus providing power to an electric motor in EV 415 as well as to any other electric loads or circuits in EV 415. As shown, EV 415 may include a controller 420. For example, controller 420 may be an onboard computing device installed in a vehicle as known in the art. Controller 410 may be operatively connected to controller 310 (not shown in FIG. 4 for clarity). Accordingly, any data obtained or generated by controller 420 may be provided to, and used by, controller 310.

In one embodiment, the capacity of rechargeable device 410 is such that it is capable of supplying a power surge that may be required by EV 415, e.g., for accelerating, hill climbing, or any other driving condition that require a short burst of high power. Rechargeable device 410 may or may not be recharged from an electricity grid, e.g., in a home. Due to the nature of a metal-air battery, it is expected, but not required, that the capacity of the metal-air battery 210 is significantly larger than the capacity of rechargeable device 410. The metal-air battery 210 can accordingly serve as a range extender for EV 415, and, accordingly, battery 201 or system 200 may be referred to herein as a range extender.

In order for a range extender to extend the driving distance of EV 415, the range extender (e.g., system 200 or a meta-air battery 201) may not be required to supply a momentary power requirement of EV 415, but rather, supply an average power consumption of EV 415. Accordingly, system 200 or battery 201 (referred to herein as the range extender) has to be utilized in different ways in order to accommodate for requirements of each trip. Such requirements may include maximal energetic efficiency, specific power requirement, a changing power profile, or any combination of the above. Controller 310 may configure the range extender (e.g., system 200) for any condition or requirement.

In one embodiment, controller 310 may monitor the state of charge of the rechargeable device 410, as well as other driving parameters such as driving destination, road conditions, vehicle power consumption statistics, a driving style, etc. For example, controller 310 may be connected to controller 420 installed in the EV 415 and thus receive any information needed. As described, based on data supplied by sensors, controller 310 may be aware of the state of the range extender (system 200 and/or metal-air battery 201) and the state of rechargeable device 410. For example, controller 310 may determine the capacity of the battery 201 and the capacity of rechargeable device 410 (e.g., system 200 and power source 320). Accordingly, controller 310 may choose and set any working points, charge level, power draw and/or other parameters of both system 200 (when used as a range extender) and rechargeable device 410.

For example, controller 310 may maintain a minimal state of charge of rechargeable device 410 by controlling the current being drawn from system 200. For example, if controller 310 determines that capacity of rechargeable device 410 is below a threshold, controller 310 may cause system 200 to charge the rechargeable device 410 (e.g., by connecting system 200 to rechargeable device 410 through CRSU 325).

In one embodiment, it may be desirable to control usage of a rechargeable battery or device. For example, in order to extend the life of rechargeable device 410, it may be desirable to limit its usage. In one embodiment, in order to limit usage of rechargeable device 410, controller 310 draws power from metal-air battery 201 at all times, and thus EV 415 draws power from a rechargeable battery (e.g., rechargeable device 410) only if the power from the metal-air battery 201 is insufficient for its power requirement. In other embodiments, e.g., if metal-air battery 201 is an expensive resource and rechargeable device 410 is a cheap one, controller 310 may cause rechargeable device 410 to provide as much current as can be drawn from it while keeping usage of metal-air battery 201 at a minimum. Using current regulation and switching capabilities of CRSU 325, controller 310 can discretely set power or current drawn from each power source attached to CRSU 325.

Accordingly, system 300 enables discretely setting the amount of electric power provided to load 330 or EV 415 by each power source in the system. In yet another embodiment, e.g., if, due to power cuts or electric power outage, charging rechargeable device 410 is impossible, controller 310 disconnects rechargeable device 410 from EV 415 and only reconnects rechargeable device 410 to EV 415 when metal-air battery 210 is unable to supply required power. It will be understood that, using CRSU 325, controller 310 can configure a system such that metal-air battery 210 and rechargeable device 410 each contribute a portion of the power required by EV 415 as determined by controller 310. For example, in one embodiment, controller 310 maintains the capacity of rechargeable device 410 such that it can support a power surge required by EV 415. Controller 310 may observe maximal state of charge rechargeable device 410 to enable efficient regenerative breaking or downhill energy regeneration, minimal usage of the range extender before reaching grid power, etc.

In order to maintain configured or determined thresholds, controller 310 may turn the range extender on or off at any time. When activating the range extender (e.g., by connecting system 200 to load 330 using CRSU 325), controller 310 may control the range extender (system 200) to supply nominal power for maximal energetic efficiency, to deliver maximal power, or to deliver any other set or predefined power.

A rechargeable buffer can be used as a buffer in more than one way. For example, in one embodiment, the rechargeable device is designed to have the energy capacity that is required for an EV's daily average usage of energy. In each day, if the average amount of energy is used, it may be taken solely from the rechargeable device, which, in turn, can be recharged when connected to the grid (an electric power socket in a home). If the daily energy consumption is beyond the average, controller 310 can operate the metal air battery 201 such that it delivers the additional energy that is required beyond the available energy in the rechargeable device.

Accordingly, an EV can be normally operated by charging the buffer (e.g., a rechargeable battery) on a regular basis and using the rechargeable battery for the daily, normal trips but, in cases when a trip longer than the average is taken, the metal-air battery is used, e.g., when the rechargeable battery is depleted or is discharged to a preconfigured level. For example, when a rechargeable battery is discharged down to a preconfigured level, controller 310 activates the metal-air battery. Accordingly, a system or electric vehicle according to embodiments of the invention is designed such that the capacity of a rechargeable device in the electric vehicle is designed to supply an average daily energy consumption of the electric vehicle and a metal-air battery in the electric vehicle is designed to supply energy in excess of the average daily energy.

Figure 5:
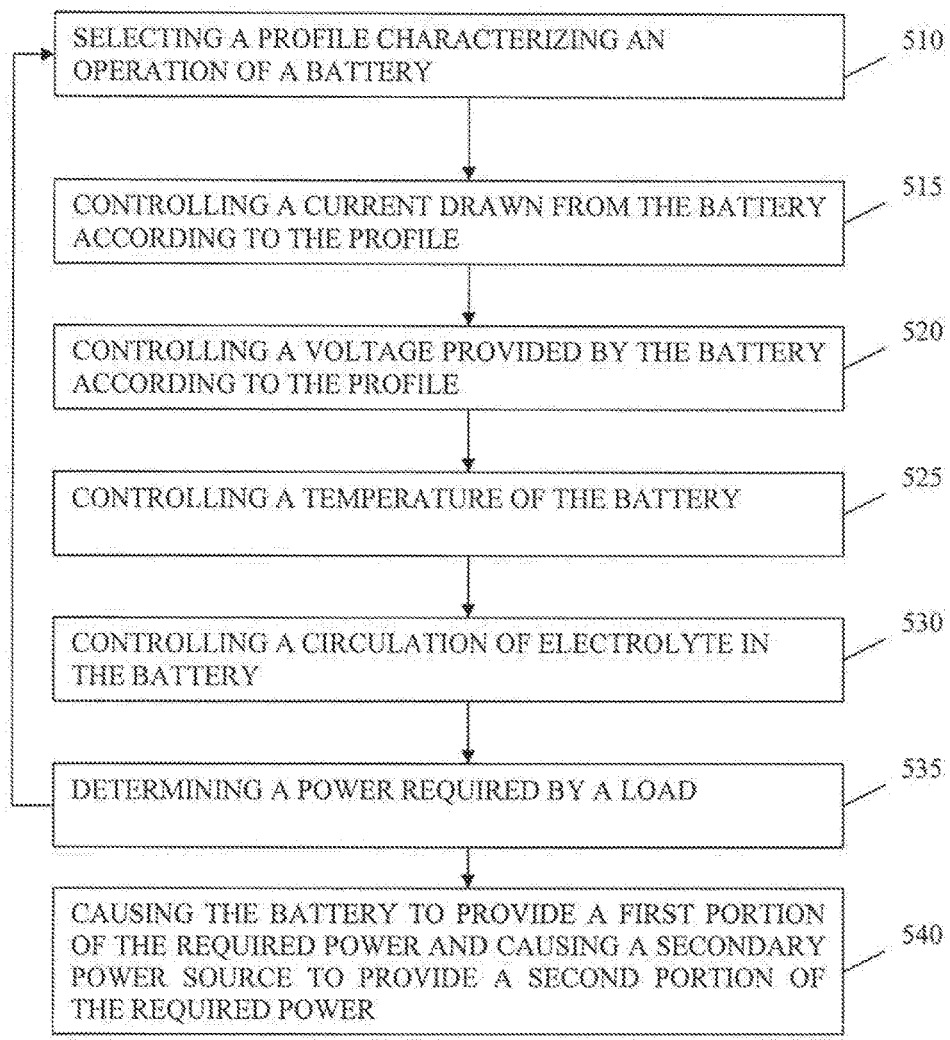
FIG. 5 shows an exemplary flow according to embodiments of the invention.

Reference is now made to FIG. 5, an exemplary flow according to embodiments of the invention. As shown by block 510, a method or flow may include selecting a profile characterizing an operation of a battery. For example, in one embodiment, controller 219 or controller 310 selects a profile that characterizes or defines an operation of battery 201. As described, in one embodiment, controller 219 or controller 310 selects a profile such that the columbic efficiency of battery 201 is maximized. For example, a profile selected includes setting the temperature of battery 201 and circulation of electrolyte in battery 201 such that the corrosion reaction as shown by equation (2) above is minimized. In another case, controller 219 or controller 310 selects a profile such that the energetic utilization of metal in battery 201 is maximized. In yet another embodiment or case, controller 219 or controller 310 selects a profile such that the electrolyte utilization in battery 201 is maximized. A profile may be a set of values stored in a memory accessible to controller 219 and/or controller 310. A plurality of profiles may be provided, e.g., by a manufacturer of battery 201 and may be stored in a memory accessible to controller 219 and/or controller 310. Accordingly, controller 219 or controller 310 may select a profile from a plurality of profiles.

Various parameters may be taken into account when selecting a profile or when causing a battery to operate based on a profile. For example, as described herein, release of hydrogen may indicate corrosion rate or level. Accordingly, in one embodiment, controller 219 uses data received from hydrogen sensor 217 to determine the level or rate hydrogen released by battery 201 and, adjusts operational parameters of battery 201 such that the rate or level of hydrogen release is kept within a predefined range. For example, a profile may indicate a rate of hydrogen release and controller 219 increases, or decreases, power consumption from battery 201, or adjusts a temperature of battery 201 such that hydrogen release limits are observed.

As shown by block 515, a method or flow may include controlling a current drawn from the battery according to the profile. For example, using current regulator 326 controller 310 controls the current drawn from battery 201. As shown by block 520, a method or flow may include controlling a voltage provided by the battery according to the profile. For example, controller 219 controls the temperature of battery 201 and thus, as described, increases or decreases the voltage provided by battery 201. As shown by block 525, a method or flow may include controlling a temperature of the battery. For example, by controlling heat exchanger 205 controller 219 decreases or increases the temperature of electrolyte in battery 201 thus decreases or increases the temperature of battery 201.

As shown by block 530, a method or flow may include controlling a circulation of electrolyte in the battery. For example, controller 219 controls pump 207 thus controlling a circulation of electrolyte through cells in battery 201. In one embodiment, controlling operational parameters as shown by blocks 515, 520, 525 and 530 may be according to, or based on a profile.

As shown by block 535, a method or flow may include determining a power required by a load. For example, controller 310 determines a load based on information received from controller 420 in an EV 415. Determining a load may include predicting a load. For example, controller 310 uses global positioning system (GPS) data to predict a load. In another case, controller 310 uses a route specification received from controller 410 to predict a load. In one embodiment, controller 310 selects a profile based on a predicted load. For example, if based on a travelled route, controller 310 identifies that an up hill travel is expected then controller 310 selects a profile where by the power provided by battery 201 is maximized. When determining that the power required is low, e.g., based on revolutions per minute (RPM) of an electric motor in EV 415, controller 310 selects a profile whereby the corrosion rate in battery 201 is minimized. Any data collected by controller 420 in EV 415 may be used in order to select a profile or otherwise set working parameters of battery 201 or system 200.

As shown by the arrow connecting blocks 535 and 510, selecting a profile may be automatic and dynamic. For example, determining that EV 415 is stationary based on data received from controller 420, controller 219 or controller 310 selects a profile such that low power is produced and corrosion rate is minimized. Next, determining EV 415 is in motion, controller 219 or controller 310 selects a profile such that power provided by battery 201 is maximized.

As shown by block 540, a method or flow may include causing a battery to provide a first portion of the required power and causing a secondary power source to provide a second portion of the required power. For example, by controlling CRSU 325, controller 310 causes battery 201 to provide a predefined current to load 330 (that may be EV 415) and further causes electric source 320 to provide additional current such that a demand for power by load 330 is satisfied. In one embodiment, when power is required, a power regulator limits the power provided by battery 201 and the rest of the required power is provided by a rechargeable battery that serves as a buffer. Accordingly, a buffer is used for cases when a demand for power peaks.

Unless explicitly stated, the method embodiments described herein are not constrained to a particular order or sequence. Additionally, some of the described method embodiments or elements thereof can occur or be performed at the same point in time.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

Various embodiments have been presented. Each of these embodiments may of course include features from other embodiments presented, and embodiments not specifically described may include various features described herein.

The invention claimed is:

1. A method of controlling operation of a metal-air battery, the method comprising:
controlling a current drawn from the metal-air battery and a temperature of the metal-air battery by controlling a temperature of electrolyte included in the metal-air battery and by controlling a circulation of the electrolyte included in the metal-air battery until the metal-air battery operates according to a profile,
wherein the profile defines at least one of: an energetic utilization ratio, power, an electrolyte utilization value and a corrosion rate.

2. The method of claim 1, further comprising determining an age of an electrolyte included in the battery and controlling, based on the age of the electrolyte, at least one of: an electric current provided by the battery, a temperature of the battery, a temperature of the electrolyte and voltage provided by the battery.

3. The method of claim 1, further comprising controlling at least one of: an electric current provided by the battery, a temperature of the battery, a temperature of an electrolyte and a voltage provided by the battery, such that a predefined ratio between an amount of metal consumed in an electrochemical reaction and a total amount of metal in the battery is maintained.

4. The method of claim 1, further comprising controlling at least one of: an electric current provided by the battery, a temperature of the battery, a temperature of an electrolyte and a voltage provided by the battery such that a predefined corrosion rate of metal included in the battery is maintained.

5. The method of claim 1, further comprising controlling at least one of: an electric current provided by the battery, a temperature of the battery, a temperature of an electrolyte and a voltage provided by the battery to maximize an amount of energy drawn from the battery per volume unit of electrolyte included in the battery.

6. The method of claim 1, further comprising controlling at least one of: an electric current provided by the battery, a temperature of the battery, a temperature of an electrolyte and a voltage provided by the battery to minimize a rate by which metal is dissolved in electrolyte included in the battery.

7. The method of claim 1, wherein controlling a temperature of the battery includes controlling a circulation of electrolyte included in the battery.

8. The method of claim 1, comprising:
prior to activating the battery, determining an age of an electrolyte included in the battery; and
setting the temperature of the electrolyte according to a profile.

9. A system comprising:
a metal-air battery; and
a controller, the controller configured to:
control a current drawn from the metal-air battery and a temperature of the metal-air battery by controlling a temperature of electrolyte included in the metal-air battery and by controlling a circulation of the electrolyte included in the metal-air battery until the metal-air battery operates according to a profile,
wherein the profile defines at least one of: an energetic utilization ratio, power, an electrolyte utilization value and a corrosion rate.

10. The system of claim 9, comprising a rechargeable device, the system configured to:
draw a predefined power from the metal-air battery, the predefined power defined according to an average power requirement; and
draw power from the rechargeable device when power required by the electric car is greater than the predefined power.

11. The system of claim 9, wherein the controller is configured to control at least one of: an electric current provided by the battery, a temperature of the battery, a temperature of an electrolyte and a voltage provided by the battery such that a predefined ratio between an amount of metal consumed in an electrochemical reaction and a total amount of metal in the battery is maintained.

12. The system of claim 9, wherein the controller is configured to control at least one of: an electric current provided by the battery, a temperature of the battery, a temperature of an electrolyte and a voltage provided by the battery such that a predefined corrosion rate of metal included in the battery is maintained.

13. The system of claim 9, wherein the controller is configured to control at least one of: an electric current provided by the battery, a temperature of the battery, a temperature of an electrolyte and a voltage provided by the battery to maximize an amount of energy drawn from the battery per volume unit of electrolyte included in the battery.

14. The system of claim 9, wherein the controller is configured to:
  prior to activating the battery, determine an age of an electrolyte included in the battery; and
  set the temperature of the electrolyte according to a profile.

15. A an electric vehicle comprising:
  a metal-air battery;
  rechargeable device; and
  a controller, the controller configured to:
  control a current drawn from the metal-air battery and a temperature of the metal-air battery by controlling a temperature of electrolyte included in the metal-air battery and by controlling a circulation of the electrolyte included in the metal-air battery until the metal-air battery operates according to a profile, and to set the power supplied to the electric vehicle according to the profile, the profile defines at least one of: an energetic utilization ratio, a power rate, an electrolyte utilization value, and a corrosion rate.

16. The electric vehicle of claim 15, wherein when power required by the electric vehicle is less than a preconfigured power, the electric vehicle is configured to use power provided by the metal-air battery to charge the rechargeable device.

17. The electric vehicle of claim 15, wherein the capacity of the rechargeable device is designed to supply an average daily energy consumption of the electric vehicle and wherein the metal-air battery is designed to supply energy in excess of the average daily energy.

* * * * *